United States Patent [19]

Nohara et al.

[11] Patent Number: 4,870,642
[45] Date of Patent: Sep. 26, 1989

[54] DEMAND-ASSIGNMENT COMMUNICATION SYSTEM

[75] Inventors: Mitsuo Nohara; Fumio Takahata, both of Tokyo, Japan

[73] Assignee: Kokusai Denshin Denwa Kabushiki Kaisha, Tokyo, Japan

[21] Appl. No.: 172,951

[22] Filed: Mar. 22, 1988

Related U.S. Application Data

[63] Continuation of Ser. No. 917,659, Oct. 9, 1986, abandoned.

[30] Foreign Application Priority Data

Oct. 17, 1985 [JP] Japan .................. 60-229819

[51] Int. Cl.⁴ .................. H04B 7/185; H04J 1/00
[52] U.S. Cl. .................. 370/75; 455/12
[58] Field of Search .................. 370/75, 118; 455/12, 455/17

[56] References Cited

U.S. PATENT DOCUMENTS

| | | | |
|---|---|---|---|
| 3,028,488 | 4/1962 | Hudspeth et al. | 455/12 X |
| 3,283,249 | 11/1966 | Mitchell | 455/17 |
| 3,517,312 | 6/1970 | Yamato et al. | 455/12 |
| 3,546,386 | 12/1970 | Darcey | 370/75 X |
| 3,548,108 | 12/1970 | Yamato et al. | 455/12 X |
| 3,564,147 | 2/1971 | Puente et al. | 370/75 X |
| 3,683,116 | 8/1972 | Dill | 370/75 X |
| 4,090,036 | 5/1978 | Stott et al. | 455/12 X |
| 4,144,495 | 3/1979 | Metzger | 455/17 |
| 4,783,779 | 11/1988 | Takahata et al. | 455/17 |

FOREIGN PATENT DOCUMENTS 0075935 5/1983 Japan .................. 455/12

OTHER PUBLICATIONS

J. D. Kiesling, "Communications Satellite Systems Using SS-FDMA", Conference-Intelcon 79, Exposition Proceedings, Dallas, Tex., Feb. 26-Mar. 2, 1979, pp. 362-366.

Primary Examiner—Douglas W. Olms
Assistant Examiner—Melvin Marcelo
Attorney, Agent, or Firm—Emmanuel J. Lobato; Robert E. Burns

[57] ABSTRACT

A demand-assignment communication system is disclosed, in which a plurality of earth stations share a plurality of satellite communication channels in one satellite transponder frequency band, and in which a plurality of carriers with a plurality of transmission frequency bands determined according to transmission rate corresponding to plural kinds of communication circuits of different transmission rates are integrally handled and which, upon occurrence of a call from one of the earth stations to another, assigns to the call a satellite communication channel corresponding to the transmission frequency band necessary therefor. In accordance with the present invention, the frequency slot positions for the satellite communication channels and the order of assignment thereof are determined for each kind of transmission frequency bands necessary for the communication circuits, and each satellite communication channel is assigned to the frequency slot position therefor in the order of its assignment to comply with a request for assignment of one of the satellite communication channels to the call.

4 Claims, 3 Drawing Sheets

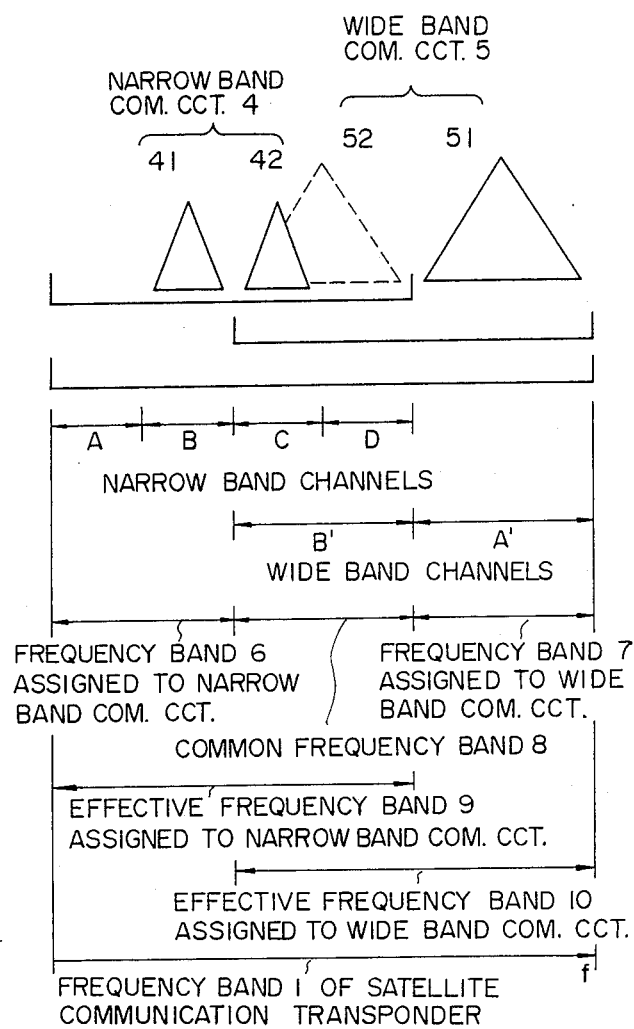

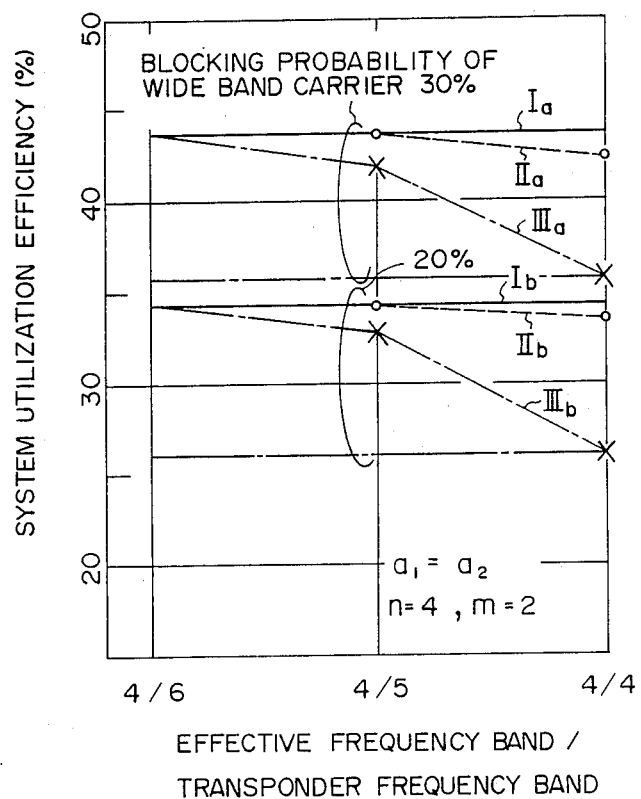

DEMAND-ASSIGNMENT COMMUNICATION SYSTEM

This is a continuation, of application Ser. No. 06/917,659, filed Oct. 9, 1986, now abandoned.

BACKGROUND OF THE INVENTION

The present invention relates to a demand-assignment communication system, and more particularly to a satellite communication channel assignment system therefor.

In an FDMA (Frequency Division Multiple Access) satellite communication system which accomodates a number of earth stations and handles plural kinds of communication circuits with different transmission frequency bands corresponding, respectively, to a plurality of transmission rates, a demand-assignment communication system has been employed, in which a plurality of earth stations share a plurality of satellite communication channels and in-which, upon each occurrence of a call, one of the satellite communication channels corresponding to the transmission frequency band necessary for the call between a calling earth station and a called earth station is assigned, so that the utilization efficiency of the satellite communication system increases in comparison with a system in which communication circuits corresponding respectively to transmission frequency bands are fixedly assigned, for each kind, in the number commensurate with the traffic between earth stations.

In the above-mentioned demand-assignment communication system which assigns a satellite communication channel of the required transmission frequency band in response to the occurrence of a call, the assignment of satellite communication channels onto a common satellite transponder frequency band encounters what is called a separation fraction circuit effect which makes it impossible to assign an idle frequency band to a new call according to the state of connection of satellite communication channels since idle frequency bands are discretely separated although the sum of idle frequency bands is larger than the frequency band necessary for the assignment of the satellite communication channel to the new call.

SUMMARY OF THE INVENTION

An object of the present invention is to provide a demand-assignment system which reduces restrictions on the assignment of a satellite communication channel to a new call by the above-said separated fraction circuit effect, and improves the utilization efficiency of the satellite system.

To attain the above object, according to the present invention, correspondence between satellite communication channels for communication circuits corresponding, respectively, to transmission frequency bands and the satellite transponder frequencies is set to be different with the kinds of communications circuits. In particular, in a case where the frequency band of the satellite transponder which is assigned to the satellite communication system according to the demand-assignment communication system of the present invention is wider than the frequency band actually usable by the satellite communication system (which frequency band will hereinafter be referred to as the effective frequency band), the frequencies corresponding respectively to the satellite communication channels for each kind of communication circuits are set as far apart as possible within the satellite transponder frequency band assigned thereto, with a view to reducing the probability that the state of connection of the satellite communication channels of each kind of communication circuits impedes new assignment of the satellite communication channels of the other kind of communication circuits.

As described above, according to the demand-assignment communication system of the present invention, the correspondence between satellite communication channels for plural kinds of communication circuits corresponding respectively to transmission frequency bands and the satellite transponder frequencies is set for each kind of communication circuits. Especially, when the satellite transponder frequency band assigned to the satellite communication system is wider than the effective frequency band, each kind of communication circuits are assigned in a frequency band for their exclusive use and a frequency band common to the other kind of communication circuits within the range of the effective frequency band, so that the correspondence of the communication circuits to the satellite communication channel frequencies is set in both of the exclusive and common frequency bands. The selection order of the satellite communication channels for respective kinds of communication circuits is set so that the frequency bands of satellite communication channels with high priorities for selection are as far apart as possible. In a case where the satellite transponder frequency band is larger than the effective frequency band and the assignment of the satellite communication channels to each kind of communication circuits is divided into exclusive and common frequency bands, the channel selection order is set so that the satellite communication channels corresponding respectively to the frequency bands for the exclusive use of each kind of communication circuits have priority over the satellite communication channels corresponding respectively to the common frequency band. In this case, the selection order of satellite communication channels to each kind of communication circuit assignment in the common frequency band is set to be different as much as possible from the selection order of satellite communication channels to the other kind of communication circuit assignment.

BRIEF DESCRIPTION OF THE DRAWINGS

The present invention will be described in detail below with reference to the accompanying drawings, in which:

FIG. 3 is a frequency arrangement diagram illustrating a third embodiment of the communication circuit assignment system of the present invention; and FIG. 4 is a characteristic diagram showing the effect of the present invention.

DETAILED DESCRIPTION

Figure 1:
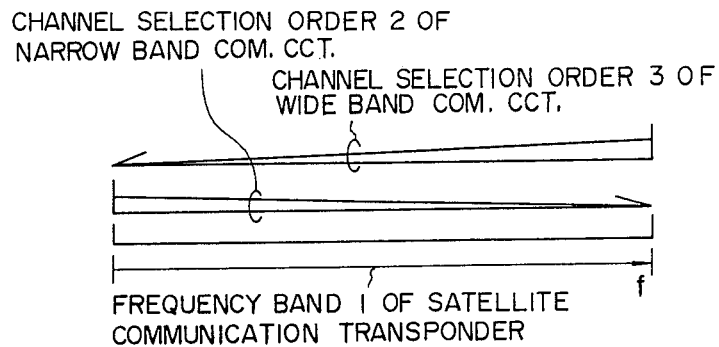
FIG. 1 is a frequency arrangement diagram illustrating a first embodiment of the communication circuit assignment system of the present invention.

With reference to FIG. 1 illustrating a first embodiment of the communication circuit assignment system of the present invention, reference numeral 1 indicates the frequency band of a satellite communication transponder assigned to a demand-assignment satellite communication system of the present invention. The arrow of the channel selection order 2 of narrow band communication circuits shows that communication circuits using narrow band carriers (hereinafter referred to as narrow band communication circuits) are assigned in the upward order of channel selection from the lowest frequency of the transponder. The arrow of the channel selection order 3 of wide band communication circuits shows that communication circuits using wide band carriers (hereinafter referred to as wide band communication circuits) are assigned in the downward order of channel selection from the highest frequency of the transponder. By determining the channel selection order of satellite communication circuits as mentioned above, the probability of use of upper and lower frequency regions of the transponder is increased and these frequency regions are substantially exclusively used for the two kinds of communication circuits although the entire frequency band of the transponder is shared by them, so that it is possible to reduce the probability of the interference to the wide band communication circuits caused by the narrow band communication circuit assignment. In this embodiment, however, since the entire frequency band of the transponder is shared by two kinds of communication circuits, it is impossible to completely eliminate their mutual influence.

Figure 2:
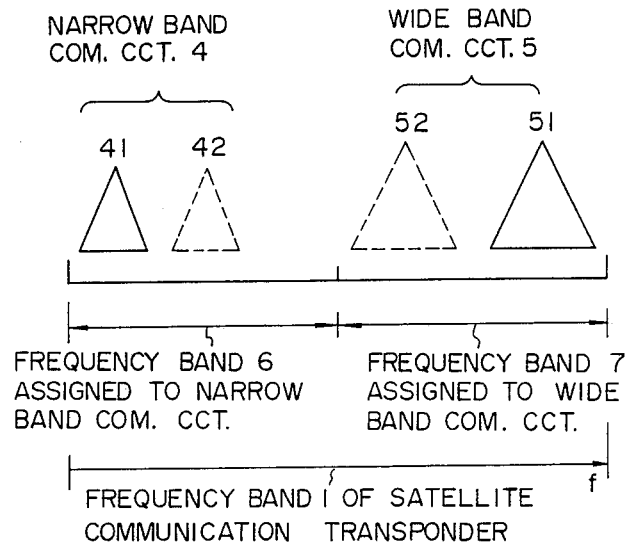
FIG. 2 is a frequency arrangement diagram illustrating a second embodiment of the communication circuit assignment system of the present invention.

FIG. 2 illustrates a second embodiment of the communication circuit assignment system of the present invention. In FIG. 2, reference numeral 4 indicates narrow band communication circuits, 5 wide band communication circuits, 41 and 42 examples of assignment of satellite channels to the narrow band communication circuits, and 51 and 52 examples of assignment of satellite channels to the wide band communication circuits. In this example, the frequency band 1 of satellite communication transponder is split into a frequency band 6 assigned to narrow band communication circuits and a frequency band 7 assigned to wide band communication circuits. In this instance, the circuit connection state in one of the frequency bands has no influence upon the other, and accordingly, the circuit assignment can be effected within the range of the effective frequency band equal to each assigned frequency band. However, it is only when the effective band is appreciably narrow that frequency bands can be set for respective circuits, as shown; and such setting of frequency bands is inappropriate for plural kinds of communication circuits, in particular.

FIG. 3 illustrates a third embodiment of the communication circuit assignment system of the present invention, in which the frequency band 1 of satellite communication transponder is divided into a frequency band 6 assigned to narrow band communication circuits, a frequency band 7 assigned to wide band communication circuits, and a common frequency band 8.

This embodiment will hereinafter be described in more detail.

A description will be given first of the system of assignment of the satellite communication channel assignment to the narrow band communication circuits. The first priority of selection to the narrow band communication circuit assignment is given to satellite communication channels corresponding to frequencies A and B in the frequency band 6 assigned to the narrow band communication circuits, and the next priority to satellite communication channels corresponding to frequencies C and D in the common frequency band 8. That is, the frequency A has priority over the frequency B in the frequency band 6, which in turn has priority over the frequencies C and D in the common frequency band 8. In case of assigning such a satellite communication channel in response to the occurrence of a call in a narrow band communication circuit, each satellite communication channel is checked in the order of its priority as to whether it is idle or busy. If the channel is idle and can be assigned to the new call, then the channel is assigned to the call. In this case, however, such assignment of the satellite communication channel is possible only within a range in which the sum of the frequency bands of the narrow and wide band communication circuits connected to the satellite communication system is not in excess of the effective frequency band.

Next, a description will be given of the satellite communication channel assignment to the wide band communication circuits. As is the case with the narrow band communication circuits, a satellite communication channel corresponding to a frequency A' in the frequency band 7 assigned to wide band communication circuits has priority over a satellite communication channel corresponding to a frequency B' in the common frequency band 8. In case of assigning such a satellite communication channel in response to the occurrence of a new call in a wide band communication circuit, each satellite communication channel is checked in the order of its priority as to whether it is idle or busy. If the channel is idle and can be assigned to the new call, then it is assigned to the new call. In this instance, however, the channel assignment to the new call can be achieved only when the sum of the frequency bands of satellite communication circuits connected to the satellite communication system.

In the common frequency band 8, the frequencies C, D and B' are assigned in common to the satellite communication channels for the communication circuits in both of the narrow and wide bands. The wide band channel corresponding to the frequency B' cannot be used when either one or both of the narrow band channels corresponding to the frequencies C and D are busy. In such a case, if a call occurs in the wide band channel corresponding to the frequency B', the call will be blocked. On the other hand, when the wide band channel corresponding to the frequency B' is busy, the narrow band channels corresponding to the frequencies C and D cannot be used.

With the above-described arrangement, the correspondence between respective kinds of satellite communication channels and frequencies in accordance with the transmission frequency bands of the former is set so that the frequencies of satellite communication circuits of higher priorities, in particular, do not overlap; this produces the effect of reducing the possibility that the assignment of each of the satellite communication channels of higher priorities, i.e. higher frequency of use, to a new call is interfered by the connections of the other communication circuits to satellite communication channels. This effect especially marked when the frequency band of the satellite transponder assigned to the demand-assignment system of the present invention is larger than the effective frequency band, because there is no interference with the assignment of the channels to the respective kinds of communication circuits in the frequency bands assigned thereto exclusively. In consequence, the blocking probability of the wide band communication circuits diminishes, thus providing for enhanced utilization efficiency of the satellite communication system.

FIG. 4 shows examples of system utilization efficiencies for the sake of comparison. In FIG. 4, it is assumed that the band width $a_1$ of an effective frequency band 9 assigned to narrow band communication circuit and the band width $a_2$ of an effective frequency band 10 assigned to wide band communication circuit are equal, that the number n of narrow band communication circuits is four, and that each channel for one wide band communication circuit has a frequency band twice (m=2) larger than that of each channel for one narrow band communication circuit. The abscissa represents the ratio of the effective frequency band to the transponder frequency band, and the ordinate the system utilization efficiency. The solid lines $I_a$ and $I_b$ show characteristics of a random assignment algorithm irrespective of the channel sequence, the chain lines $II_a$ and $II_b$ show the characteristics of a block assignment algorithm with orderly selection of channels on a fixed-priority basis according to the present invention, and the one-dot-chain lines $III_a$ and $III_b$ show characteristics of a conventional block assignment algorith with random selection of channels by the use of the communication circuit assignment shown in FIG. 3. Moreover, the two-dot-chain lines $III_a$ and $III_b$ characteristics of a conventional block assignment algorithm with random selection of channels under non division of the transponder frequency band. The characteristic lines $I_a$, $II_a$ and $III_a$ correspond to a case of blocking probability 30% of wide band carrier and the characteristic lines $I_b$, $II_b$ and $III_b$ to a case of blocking probability 20% of wide band carrier.

It is seen from FIG. 4 that the random assignment algorith irrespective of the channel sequence provides ideal characteristics and that the block assignment algorith with orderly selection of channels according to the present invention is a great improvement upon the prior art block assignment algorith with random selection of channels.

We claim:

1. A demand-assignment communication system for a satellite used for communication between earth stations sharing communication channels in one satellite transponder comprising, a communication transponder having a transponder frequency band, a plurality of narrow band communication circuits assigned frequency bands in an upward order of channel selection from the lowest frequency of the transponder, a plurality of wide band communication circuits assigned frequency bands in a downward order of channel selection from the highest frequency of the transponder, and the narrow band communication circuits and the wide band communication circuits sharing frequency bands not more than the entire frequency band of the transponder for demand-assignment when a call between earth stations is made.

2. A demand-assignment communication system for a satellite used for communication between earth stations sharing communication channels in one satellite transponder comprising, a communication transponder having a transponder split frequency band, a plurality of narrow band communication circuits, satellite channels assigned to the narrow band communication circuits, a plurality of wide band communication circuits, satellite channels assigned to the wide band communication circuits, the transponder split frequency band consisting of frequency bands assigned to the narrow band communication circuits and frequency bands assigned to the wide band communication circuits, and the communication circuits having fixed orders of priority different from each other for kinds of narrow bands and wide bands, for demand-assignment when a call between earth stations is made, and the transponder split frequency band being not less than a sum of the frequency bands actually assigned.

3. A demand-assignment communication system for a satellite used for communication between earth stations sharing communication channels in one satellite transponder comprising, a communication transponder having a plurality of narrow band communication circuits and a plurality of wide band communication circuits, the transponder having a transponder frequency band wider than an effective frequency band determined by the transmission power of the transponder and assigned to the narrow band communication circuits corresponding to narrow band communication channels having frequencies A and B selected from lower frequencies of the transponder frequency band, a transponder frequency band assigned to the wide band communication circuits corresponding to a wide ban communication channel having a frequency A' selected from higher frequencies of the transponder frequency band, a transponder common frequency band assigned to narrow band communication circuits corresponding to narrow band communication channels having frequencies C, and D or to a wide band communication circuit corresponding to a wide band communication channel having a frequency B' in accordance with the occurrence orders of calls of the frequencies D and B', and the effective frequency band of the transponder frequency band being not less than the sum of the frequency bands actually assigned therein.

4. A demand-assignment communication system for a communication satellite having a plurality of satellite communication channels in one satellite transponder frequency band shared in operation by a plurality of earth stations, and in which a plurality of carriers with a plurality of transmission frequency bands determined according to transmission rate corresponding to plural kinds of communication circuits of different transmission rates are integrally handled and upon occurrence of a call from one of the earth stations to another, the transponder assigns to the call a satellite communication channel corresponding to the transmission frequency band necessary therefor, characterized in that frequency slot positions for the satellite communication channels and the orders of assignment thereof different from one another are determined on a fixed order of priority of each kind of transmission frequency band necessary for the communication circuits, and each satellite communication channel hving a frequency slot position therefor is assigned in operation in said fixed order of priority assignment to comply with a request for assignment of one of the satellite communication channels to a call in case where the satellite transponder frequency band is not less than a sum of the transmission frequency bands actually assigned.

* * * * *